Patented May 6, 1941

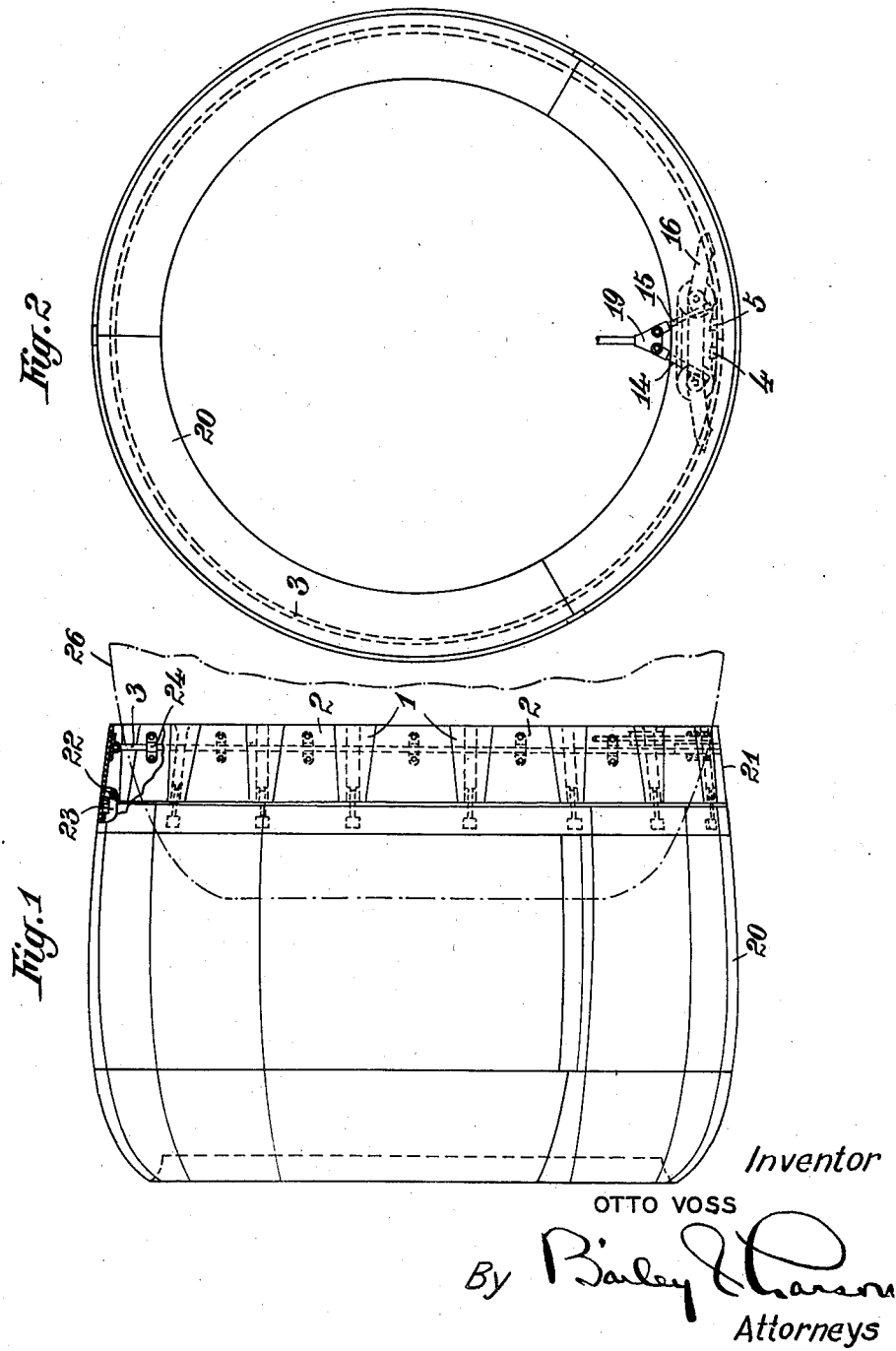

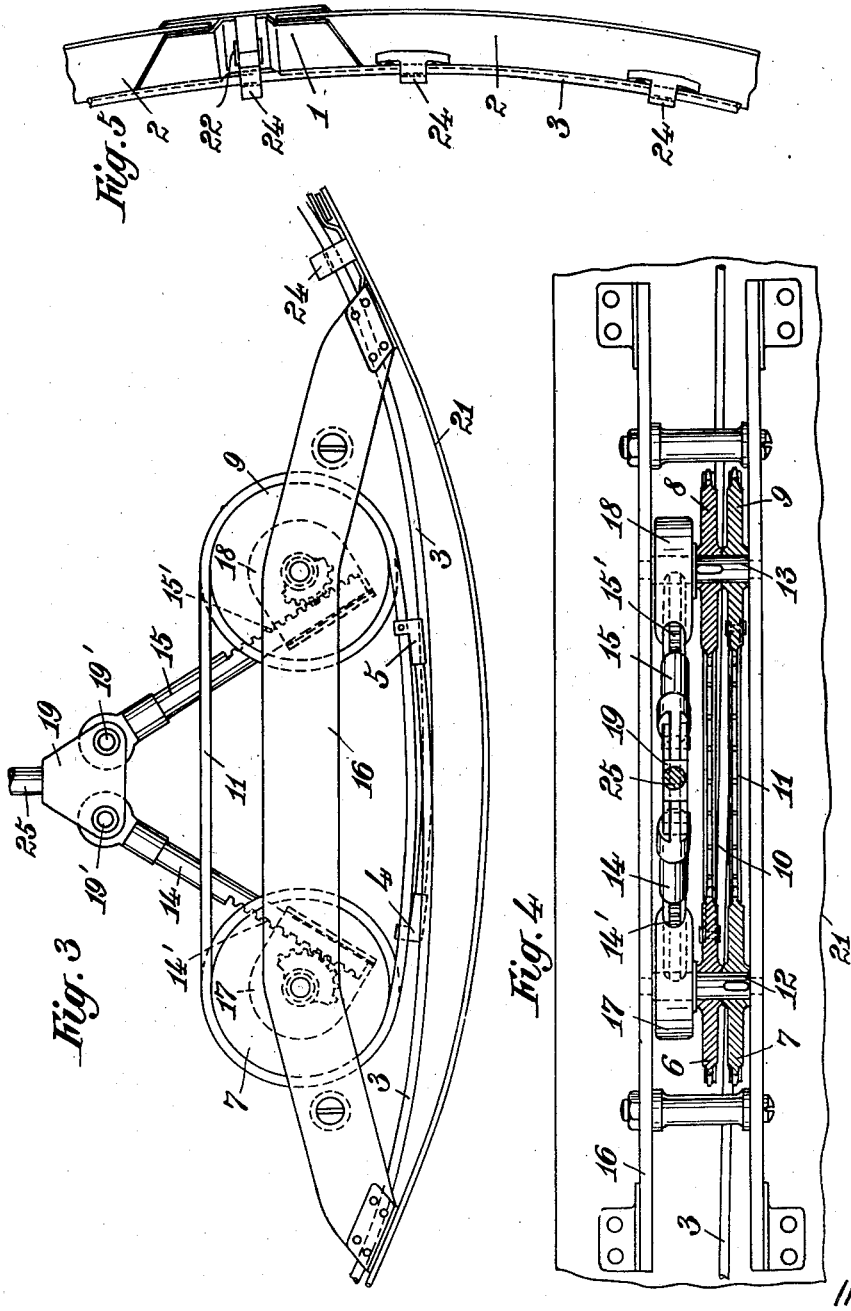

2,240,875

UNITED STATES PATENT OFFICE 2,240,875

COWLING FOR AIRCRAFT ENGINES WITH MOVABLE AIR OUTLET FLAPS

Otto Voss, Erfurt, Germany, assignor to Arado Flugzeugwerke Gesellschaft mit beschrankter Haftung, Brandenburg, Havel, Germany, a German company Application July 28, 1938, Serial No. 221,867
In Germany August 31, 1937

10 Claims. (Cl. 123—171)

The invention relates to an aircraft engine a cowling on the rear edge of which air outlet flaps are arranged which open rearwards and can be moved together from one point.

In known cowlings of this kind a sprocket wheel is associated with each of the outlet flaps the rotations of the sprocket wheel being transmitted by a separate mechanism to the flaps. Over all these sprockets distributed over the periphery of the engine cowling runs a chain which is driven by hand, by means of a crank, when the flaps are to be opened or closed. Such arrangements because of the large number of sprocket wheels and transmission mechanisms required are very complicated and, consequently, are of great weight.

The invention avoids these disadvantages by a considerably simplified control of the air outlet flaps. The invention consists in providing an arrangement in which the air outlet flaps are coupled with one another by means of a spreading split ring, the diameter of which can be positively increased or reduced, the flaps being positively opened by increasing the diameter, and positively closed by reducing the diameter.

In the preferred embodiment in order to increase or reduce the diameter of the spreading ring the ends of the ring are moved relatively to one another by swivelling link bars which are rotatably secured to a shifting member.

Further features of the invention will appear from the following description of the embodiment of the invention illustrated by way of example in the accompanying drawings.

Fig. 1 is a complete view of the new engine cowling seen from the side.

Fig. 2 is an end elevation.

Fig. 3 shows in side elevation and on an enlarged scale the arrangement serving for actuating the spreading ring.

Fig. 4 is a plan view of this arrangement, while

Fig. 5 shows three adjacent air outlet flaps opposed to the direction of flight.

Referring to the drawings, 1 and 2 are the air outlet flaps. The flaps 1 are pivotally secured by means of links 22, to arms 23 which are arranged on the periphery of the engine cowling 20. The flaps 2, which as shown in Fig. 5, engage in the flaps 1, are provided with lugs 24 through which passes a spreading ring 3 which is a split ring.

The overlapping ends 4, 5 of the spreading ring 3 are secured to chains 10 and 11 which as shown in Figs. 2, 3 and 4 pass around sprocket wheels. These sprocket wheels are actuated by rods 14 and 15 which are pivoted to a shifting member 19. The sprockets are mounted in a frame 16 which is secured to a sheet 21 extending the flap portion of the cowling to form an annular band, which sheet is detachably secured (in manner not shown) to the cowling 20. The reference numeral 26 indicates the front portion of the aircraft fuselage.

As shown in Figs. 3 and 4, one end 4 of the spreading ring 3 is secured to a chain 10 which is led over the sprocket wheels 6 and 8, while the other end 5 of the spreading ring is secured to a chain 11 which passes over the sprocket wheels 7 and 9. The sprocket wheels 6 and 7 are mounted on a shaft 12 rotatably mounted in the framework 16. The sprocket 6 can rotate loosely on the shaft 12 while the sprocket 7 is firmly connected with the same shaft for example by means of a key. The sprockets 8 and 9 are arranged on a shaft 13 also rotatably mounted in the framework, the sprocket 8 being fast and the sprocket 9 loosely mounted on the said shaft.

An interponent 17 is firmly secured to the shaft 12, and an interponent 18 is firmly secured with the shaft 13.

The two interponents are provided with bores formed as guides which are traversed by the lower ends of the link bars 14, 15 in such manner that these ends are movable in the bores. The lower part of the link bars 14, 15 are formed as rack bars having teeth indicated in Fig. 3 as 15' and 14'. These teeth of the link bars 14, 15 engage toothed segments connected or integral with the interponents 17 and 18. When the two link bars are moved axially a positive rotation of the interponents 17 and 18 is produced. In order to facilitate this rotation the upper ends of the link bars 14 and 15 are pivotally connected a shifting member 19, as at 19'. A rod 25 is connected to the shifting member which rod can be actuated, if desired, for example, by the pilot through suitable transmission mechanism and interponents (not shown).

The modus operandi of the shifting device is as follows:

If the shifting member 19 is moved downwardly by actuating the rod 25, the bars 14 and 15 are spread apart. They move in the bores of the interponents 17 and 18 and at the same time effect rotation of these members. The member 17 rotates in clockwise direction and, since it is firmly connected with the shaft 12, carries the sprocket wheel 7 therewith. The sprocket wheel 7 transmits the movement imparted to it to the chain 11 and thus to the sprocket 9. The end 5 of the spreading ring 3 is thus moved from right to left in Fig. 3. The interponent 18 rotates in counter-clockwise direction and produces corresponding rotary movement of the sprockets 8 and 6 and a corresponding movement of the chain 10. The end 4 of the spreading ring is thus displaced from left to right. The two ends of the ring are thus moved apart so that the ring spreads apart increasing its diameter and raises the rear edges of the flaps 2.

As the flaps 1 engage in the flaps 2 as shown in Fig. 5 the flaps 1 are also elevated so that the cooling air flowing through the cowling can escape through the openings formed between the flaps and the fuselage.

If the rod 25 and thus the shifting member 19 are moved upwardly the above described movements all take place, but in an opposite direction, so that the flaps are closed.

The invention is not limited to the embodiment described by way of example. It is not necessary that movable flaps be pivoted to an engine cowling. They can be secured to a cowling surrounding an annular cooler or the like, while still retaining the new adjusting mechanism.

Moreover, particularly in dealing with small and comparatively light flaps, the sprocket wheels and chains can be dispensed with, the pivoting ends of the link bars being connected directly to the ends of the spreading ring.

I claim:

1. A cowling for aircraft engines, said cowling having a plurality of air outlet flaps adapted to open outwardly, a substantially annular ring connecting said flaps, said ring being severed at at least one place, means for moving the free ends of said ring with respect to each other to increase or reduce the diameter of said ring to open or close the flaps, each movement of the free ends of said ring with respect to each other actuating a plurality of flaps positively to open or close said flaps simultaneously.

2. A cowling for aircraft engines, said cowling having a plurality of air outlet flaps adapted to open outwardly, a spreading ring element connecting said flaps, said ring element being severed at one place, and means for moving one end of said ring element with relation to the other end to increase or reduce the diameter of said spreading ring to open or close the flaps, each movement of the free ends of said ring with respect to each other actuating a plurality of flaps positively to open or close said flaps simultaneously.

3. A cowling for aircraft engines, said cowling having a plurality of air outlet flaps adapted to open outwardly, a spreading ring element connecting said flaps, said ring element being severed at one place, and means for moving one end of said element with relation to the other end to increase or reduce the diameter of said ring element to open or close the flaps each movement of the free ends of said ring with respect to each other actuating a plurality of flaps positively to open or close said flaps simultaneously, said means including a shifting member, and link bars rotatably secured to said shifting member.

4. A cowling for aircraft engines, said cowling having a plurality of air outlet flaps adapted to open outwardly, a spreading ring element connecting said flaps, said ring element being severed at one place only, and means for moving one end of said ring element with relation to the other end to increase or reduce the diameter of said ring element to open or close the flaps positively, said means including a shifting member and link bars pivoted thereto, shafts, said link bars being carried by said shafts, sprocket wheels mounted on said shafts, and chains passing over said sprocket wheels, said chains being secured to said ring element.

5. A cowling for aircraft engines, said cowling having a plurality of air outlet flaps adapted to open outwardly, a spreading ring element connecting said flaps, said ring element being severed at one place only, and means for moving one end of said ring element with relation to the other end to increase or reduce the diameter of said ring element to open or close the flaps positively, said means including a bracket secured to said cowling, shafts supported by said bracket, pairs of sprockets mounted on said shafts with one sprocket of a pair being mounted on one shaft and the other sprocket of said pair on the other shaft, chains passing around each pair of sprockets, one chain being secured to one end of said ring element and the other chain to the other end of said element, a shifting member, and link bars operatively connected to said shifting member and said shafts to actuate said shafts in opposite directions.

6. A cowling for aircraft engines according to claim 5 in which one sprocket wheel of each pair is fast and the other loose on its shaft, the fast sprocket of the one pair being connected by a chain with the loose sprocket of the other pair, and the fast sprocket of the other pair with the loose sprocket of the first pair.

7. A cowling for aircraft engines, said cowling having a plurality of air outlet flaps adapted to open outwardly, a spreading ring element connecting said flaps, said ring element being severed in at least one place, and means for moving one end of said ring element with relation to the other end to increase or reduce the diameter of said ring element to open or close the flaps, each movement of the free ends of said ring with respect to each other actuating a plurality of flaps positively to open or close said flaps simultaneously, said means including a pair of shafts supported by said cowling, sprockets mounted on said shafts, chains passing over said sprockets, said chains being secured to different ends of said ring element, link bars, members secured to said shafts and each having a guide therein receiving a link bar, and mechanism for actuating said link bars to rotate said shafts through said members in opposite directions.

8. A cowling for aircraft engines, said cowling having a plurality of air outlet flaps adapted to open outwardly, a spreading ring element connecting said flaps, said spreading ring element being severed in at least one place, and means for moving one end of said ring element with relation to the other end for positively increasing or reducing the diameter of said ring element to open or close the flaps, each movement of the free ends of said ring with respect to each other actuating a plurality of flaps positively to open or close said flaps simultaneously, said flaps being secured alternately to the engine cowling and to said ring element, and engaging one another at their adjacent edges.

9. A cowling for aircraft engines, said cowling having a plurality of air outlet flaps adapted to open outwardly, a ring element connecting said flaps, said ring element being severed at at lease one place, a chain secured to one end of said element and disposed on a pair of sprockets, a second chain secured to the other end of said element and disposed on another pair of sprockets, and means for actuating said chains in opposite directions, whereby the ends of the element are moved relatively to each other to increase or reduce the diameter of the ring element to open or close the flaps, each movement of the free ends of said ring with respect to each other actuating a plurality of flaps positively to open or close said flaps simultaneously.

10. A cowling for aircraft engines, said cowling having a plurality of air outlet flaps adapted to open outwardly, a ring element connecting said flaps, said ring element being severed at at least one place, a member secured to one end of said ring element, a second member secured to the other end of said ring element, and means for moving said members relatively to each other to move the ends of said element to increase or decrease the diameter of said element, whereby the flaps are opened or closed, each movement of the free ends of said ring with respect to each other actuating a plurality of flaps positively to open or close said flaps simultaneously.

OTTO VOSS.